US011615383B2

(12) United States Patent
Tsai et al.

(10) Patent No.: US 11,615,383 B2
(45) Date of Patent: Mar. 28, 2023

(54) DATA SORTING AND RATING SYSTEM

(71) Applicant: salesforce.com, inc., San Francisco, CA (US)

(72) Inventors: David Tsai, San Mateo, CA (US); Carly Berman, San Francisco, CA (US); Rebecca Yukelson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 586 days.

(21) Appl. No.: 16/658,891

(22) Filed: Oct. 21, 2019

(65) Prior Publication Data

US 2021/0117937 A1    Apr. 22, 2021

(51) Int. Cl.
| | | |
|---|---|---|
| *G06F 3/048* | (2013.01) | |
| *G06Q 20/06* | (2012.01) | |
| *G06F 40/177* | (2020.01) | |
| *G06F 3/04817* | (2022.01) | |
| *G06F 3/04842* | (2022.01) | |

(52) U.S. Cl.
CPC ......... *G06Q 20/065* (2013.01); *G06F 40/177* (2020.01); *G06F 3/04817* (2013.01); *G06F 3/04842* (2013.01)

(58) Field of Classification Search
CPC . G06Q 20/065; G06F 40/177; G06F 3/04817; G06F 3/04842
See application file for complete search history.

(56) References Cited

U.S. PATENT DOCUMENTS

| | | | | |
|---|---|---|---|---|
| 8,436,871 | B2 * | 5/2013 | Alberte | G06F 3/0482 |
| | | | | 715/227 |
| 8,869,039 | B2 * | 10/2014 | Rein | G06F 16/40 |
| | | | | 715/733 |
| 2010/0162139 | A1 * | 6/2010 | Beebe | G06F 16/95 |
| | | | | 715/760 |
| 2013/0246916 | A1 * | 9/2013 | Reimann | H04N 21/8113 |
| | | | | 715/716 |
| 2018/0189893 | A1 * | 7/2018 | Elias | G06F 21/31 |

* cited by examiner

*Primary Examiner* — Mahelet Shiberou (74) *Attorney, Agent, or Firm* — Sterne, Kessler, Goldstein & Fox P.L.L.C.

(57) ABSTRACT

Disclosed herein are system, method, and computer program product embodiments providing a data sorting and rating system. An embodiment operates by detecting a user modification of a particular value of a sorted plurality of values of a column displayed in a visual interface including a sorting visual indicator indicating that the plurality of values are sorted. It is determined that the values are no longer sorted after the user modification. The sorting visual indicator is replaced with a refresh visual indicator based on the determination that the plurality of values are no longer sorted. The values including the user modification are re-sorted based on a selection of the refresh visual indicator. The re-sorted plurality of values including the user modification of the particular value are provided for display in the visual interface.

20 Claims, 4 Drawing Sheets

FIG. 1

PRIORITIZATION CLOSES ON DECEMBER 08, 2019

Select a category:
[ All ▸ ]

| IDEA NAME 220A | CATEGORY 220B | EFFORT 220C | TOTAL 220D 210 | |
|---|---|---|---|---|
| ˅ Allow tasks in queues | Analytics | Low | 50 | Prioritize |
| ˅ 4+ fields on related list | Heroku | Med | 20 | Prioritize |
| ˅ Edit Chatter Email Alert Subject Line Format to Include Actual Subject Matter | Analytics | Low | 5 | Prioritize |
| ˅ 4+ fields on related list | Communities | High | 0 | Prioritize |
| ˅ Ability to save a Chatter post as Draft | Analytics | Med | 0 | Prioritize |
| ˅ Ability to save a Chatter post as Draft | Analytics | High | 0 | Prioritize |

208

240

Coins Left:
◉ 25/100

You Selected:

4+ fields on related list
20 Coins 🗑

Edit Chatter Email Alert Subject Line Format to Include Actual Subject Matter
5 Coins 🗑

Allow tasks in queues
50 Coins 🗑

[ Submit Final Choices ]

206

Ranking 250

Community 270

DATA SORTING AND RATING SYSTEM

BACKGROUND

It can often be difficult for a company or software development team to determine which software features or program to build next. Because of the time, money, and computing resources investments often necessary to develop and implement software improvements, a wrong decision can cost a company its viability. As such, it can be helpful for decision makers at the company to receive feedback from others in order to make such a decision. However surveying or asking people their opinions can be very subjective, time consuming, and yield imprecise results.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data sorting and rating system.

Figure 1:
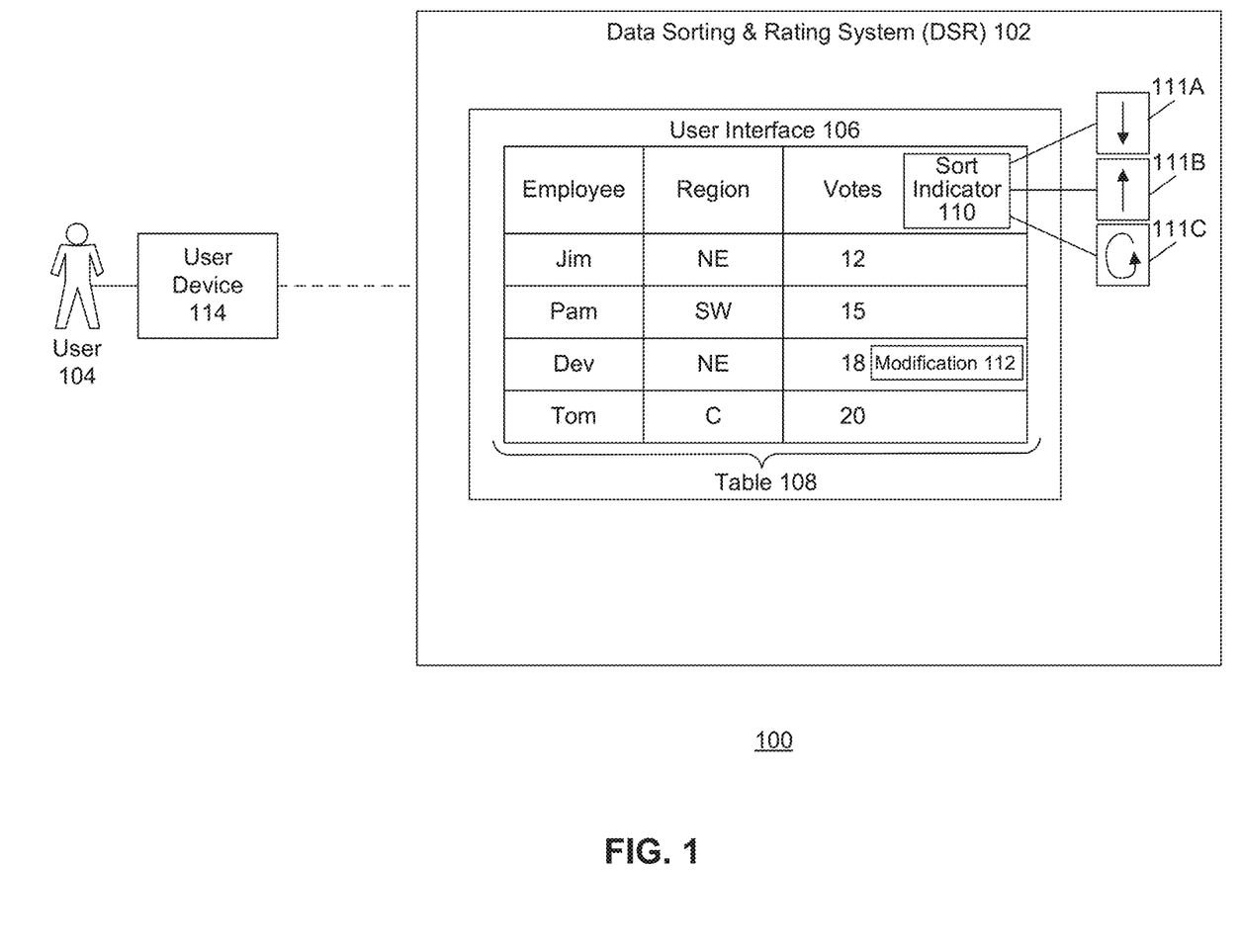
FIG. 1 is a block diagram showing example operations and functionality related to data sorting and rating, according to some embodiments.

FIG. 1 is a block diagram 100 showing example operations and functionality related to data sorting and rating, according to some embodiments.

It can often be difficult for a company or software development team to select which features or new products into which to invest time, money, and computing resources for development and implementation. A wrong decision can cost a company millions of dollars in lost profits from products not pursued, and lost investments into failing products or features. To avoid such potentially catastrophic results, the company may seek to receive user feedback to help guide or make its decision process easier. However, simply assigning employees the task of asking users their opinions can be subjective, time consuming, and yield imprecise results that are difficult for a management team to act upon. The data storage and rating system (DSR) 120 addresses these and other issues.

A user 104 may modify values in a table 108 of a user interface 106. Table 108 may include any data structure or document used to present data, at least a portion of which is modifiable by a user 104. In the example illustrated, table 108 may include a list of employees or salespeople across different regions of a company. Each member of the executive team of the company may be allocated a certain number of votes which are being used to determine the employee of the year. The executive (e.g., user 104) may decide how to distribute their allocated votes across the various employees.

In an embodiment, the records of the table 108 may be sorted in ascending or descending order by the values across one or more columns. For example, the records of table 108 may have been sorted in ascending order based on the values of the votes column.

In an embodiment, when a table 108 is sorted by a particular column, DSR 102 may display a sort indicator 110 (hereinafter also referred to as indicator 110) on or with the column. Indicator 110 may be any visual indication that the records of table 108 are sorted by the values of that column, the order of the sort (e.g., ascending or descending), or a status of the sort (e.g., whether accurate or needs refresh). Examples of indicators 110 include, but are not limited to, graphic indicators or images, icons, alphanumeric text, color changes, font style or font size changes, etc. Indicator 110 may be any visual reference that distinguishes one or more sorted values or columns of table 108 from those values or columns which are not part of the sort.

Three example indicators 110 are illustrated as ascending sort icon 111A, descending sort icon 111B, and refresh indicator 111C. Ascending sort icon 111A may indicate that the records of table 108 are or were sorted in ascending order by the values of a particular column. Descending sort icon 111B may indicate that the records of table 108 are or were sorted in descending order by the values of a particular column (in which case the largest values are at the top or appear first). As illustrated the records are sorted in ascending order by the votes column and so ascending sort icon 111A may be displayed as sort indicator 110. In another embodiment, the up arrow of 111B may indicate an ascending sort, and the down arrow of 111A may indicate a descending sort. One skilled in the art will understand that the sort features described herein may also or alternatively be applied to rows in a column oriented database or table.

User 104 may have access to or may be viewing user interface 106 on a user device 114. User interface 106 may be one or more pages or screens of an app or web/cloud based program accessible through user device 114. User device 114 may be a mobile phone, smart device (such as television), laptop, desktop, table, IoT (internet of things) device, or other computing device.

In an embodiment, user 104 may have permission to modify one or more values of table 108. As illustrated, user 104 may modify the value "18" of votes for user Dev. Modification 112 may be any new, different, or changed value(s) of table 108 in a column that has been used to sort the records of table 108.

In an embodiment, DSR 102 may detect when a value in any of the columns or rows of table 108 has been modified, deleted, added, or changed. DSR 102 may identify whether the modification 112 impacts a value in a column or row of values that have been used to sort, or partially sort, the records of table 108.

If a change impacts an unsorted column (e.g., a column or value not used to sort the records of table), the change may be saved in table 108, but no other re-sort processing is performed by DSR 102. If however, DSR 102 detects that a change or modification 112 impacts a sorted-by column, such as votes in table 108, then DSR 102 may perform additional operations.

Upon determining that modification 112 impacts a sorted-by column, DSR 112 may calculate or otherwise determine whether the modification 112 disarranges, disorganizes, or otherwise un-orders or un-sorts the values of the column. If the modification 112 is determined to un-sort at least some of the values, then DSR 102 may update the sort indicator 110 (e.g., with the refresh indicator 111C) and provide the user 104 the option of re-sorting the records of the table 108 based on the updated values (e.g., modifications 112).

In an embodiment, in determining whether the values have been un-sorted, DSR 112 may compare modification 112 to the values before and/or after the modified value to determine whether the sort is still effective or whether the values are un-sorted. For example, if the value of modification 112 is greater than 15 and less than 20, then DSR 102 may determine that the values are still sorted and the values of votes do not need to be re-sorted, or that the sort does not need to be refreshed or re-executed. This may result is no visual changes to table 108, except for the display of the new value of modification 112.

In an embodiment, the records of table 108 may include both a primary sort on votes, and a secondary sort on employee (by alphabetical order). Then, for example, both votes and employee columns may include their own unique sort indicators 110. If modified value 112 is equal to either 15 or 20, DSR 102 may then check the employee name to determine if the ascending or descending sort by employee names is un-sorted based on the corresponding name of the record corresponding to modification 112. For example, if employee is a secondary ascending sort, and modification 112 is 15, then DSR 102 may determine that the records are unsorted based on the employee name (Dev comes before Pam in an ascending order), and a sort indicator 110 of employee may be updated with a refresh indictor 111C.

In an embodiment, if DSR 102 determines that modification 112 disorganizes the sort because the new or modified value is greater than a previous value or less than a subsequent value (for a descending sort, or vice versa for an ascending sort), then DSR 102 may update sort indicator 110 to indicate to the user 104 that values are no longer sorted, or that the user may request a re-sort of the values by selecting refresh indicator 111C.

For example, if modification 112 changes the value "18" to "5", then DSR 102 may update sort indicator from ascending sort indicator 111A to refresh indicator 111C. Refresh indicator 111C may be a refresh icon that indicates the sort is out of order (because of a value update or modification 112).

In another embodiment, the modification 112 that triggers the change of sort indicator 110 to refresh indicator 111C may have been provided by a different user or system (not pictured) accessing the values of table 108. For example, instead of votes, the column may be stock prices which are ordered by current price and may be constantly updated throughout the trading day. Or, for example, table 108 may be part of a shared document that is modifiable by any different number of users. When the values are updated by another user, the updated value may appear on the table 108 on user device 114 as modification 112 and refresh indicator 111C may be made visible as described herein.

However, DSR 102 may not automatically update the sort or re-sort the values because the user 114 may be performing some analysis on the records as they are currently sorted, ordered, or arranged. An automatic re-sort may then mess up the user's concentration and cause them to lose their place or mess up their analysis. Additional for a visually-impaired user using a screen reader, an automatic re-sort may interfere with the user's ability to see or process the information. Instead, by changing the sort indicator 110 to refresh indicator 111C, DSR 102 may signal to the user that the values are no longer accurately sorted in the order as they originally were when loaded or as the user may have presumed they were. Thus DSR 102 may notify the user 104 with a change in sort indicator 110 (which may be accompanied by an audible or tactile notification as well), that the user 104 may request an update, refresh, or re-sort the records of table 108 when the user 104 is ready.

As noted above, DSR 102 may provide multiple or different sort indicators 110 based on which column(s) were used to sort the records of a table 108. For example, sort indicator 110 may be ascending value icon 111A while the values of votes are accurately sorted in ascending order (that are increasing in value, with highest values at the bottom). In an embodiment, upon detecting that modification 112 disarranges or un-sorts the sort order, a refresh indicator 111C may be provided on with the modified value (of modification 112) and one or more neighboring values that were determined to be affected by the modification 112.

For example, if the new value of modification 112 is "69" then DSR 102 may change the color, size, or style of the value 69 in table 108 to indicate the values are now un-sorted. Or, for example, DSR 102 may add a refresh indicator 111C to all or a subset of the values of the row including the modification 112. For example, the other values of the affected record ("Dev" and "NE") may both include refresh indicators 111C as well (to indicate the records are no longer sorted). In an embodiment, the refresh indicator 111C may include changing the color of the values of the record. For example, "Dev" and "NE" may be changed to color green from black, while the modified value "69" that causes the un-sort is changed to a different color, such as red.

In another embodiment, refresh indicator 111C may be a symbol such as an asterisk, an animation, a gif, italicized or bolded text, or other image. In an embodiment, applying or display refresh indicator 111C may allow user 104 to select refresh indicator 111C (with a mouse, keyboard, or finger press) that causes DSR 102 to re-sort the values of table 108, including the modification 112.

In another embodiment, a table 108 or other data structure may include values that include multiple sorts. For example, the values may be sorted first by Col A, then column D, then column E. It is understood that the application of sort indicator 110 as described herein may apply to any of the primary sorted column A, or the secondary sorts or sub-sorts on columns D or E. For example, the modification 112 only impacts the lowest sub-sort on column E, then refresh indicator 111C may only be displayed and applied to those records that are impacted by the sub-sort of column E. Upon a re-sort request, DSR 102 may then only resort the impacted records, rather than processing all of the records of table 108.

After values of table 108 have been re-sorted, DSR 102 may remove the refresh indicator 110C, or replace the refresh indicator 111C with the original color, style, or appearance of text, or the original ascending or descending sort icons 111A, 111B.

Figure 2:
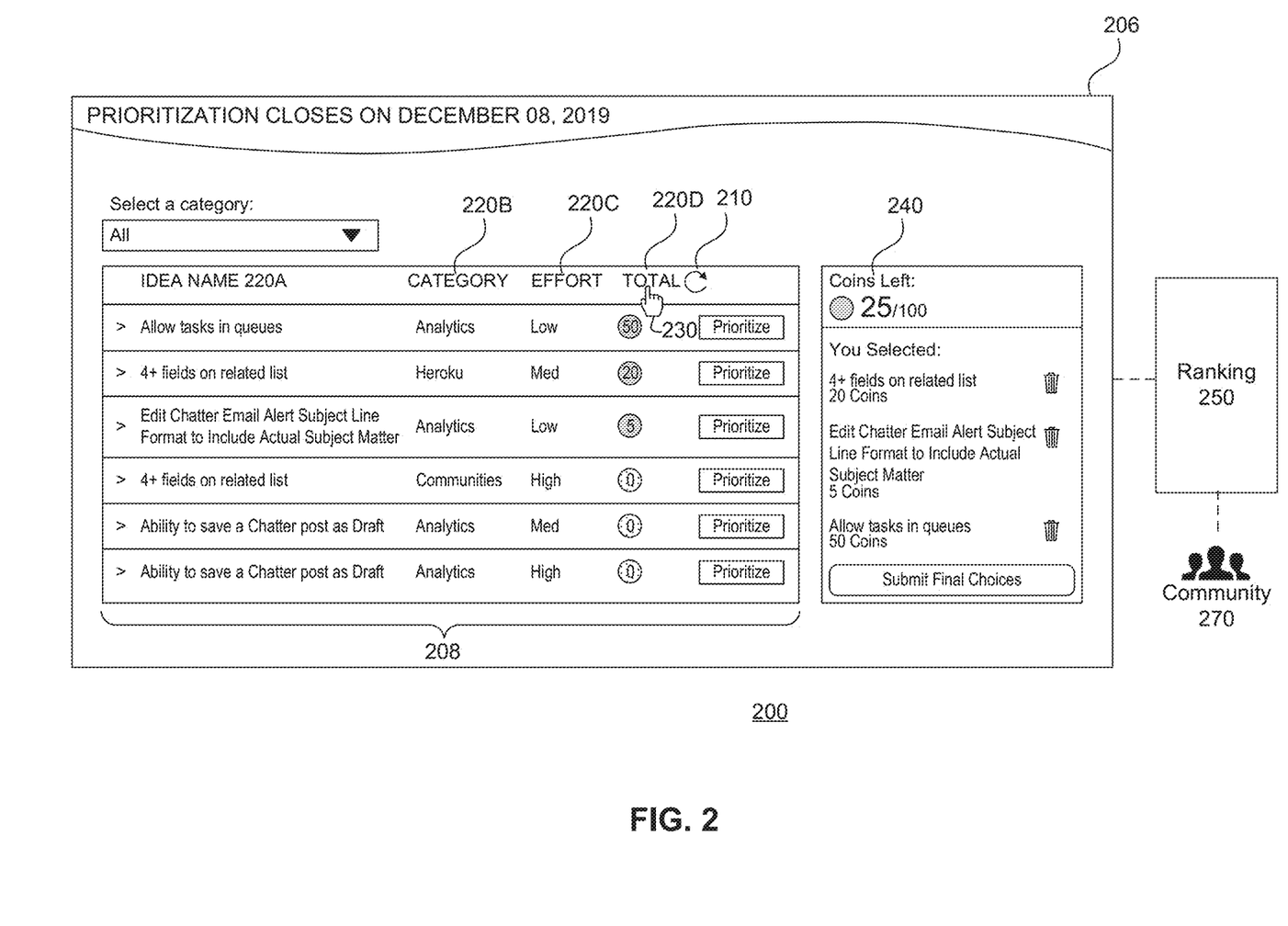
FIG. 2 is another block diagram showing example operations and functionality related to data sorting and rating, according to some embodiments.

FIG. 2 is another block diagram 200 showing example operations and functionality related to data sorting and rating, according to some embodiments.

The diagram 200 illustrates an example system or interface 206 that enables users to vote on which features, products, or ideas 220A that the user thinks or would like to see a company build or develop. In the example illustrated, ideas 220A may be features that a company is considering implementing into one or more software programs, web applications, devices, services, or apps.

In the example embodiment, a community 270 of users may each allocated a set of coins, tokens, points, or other virtual currency 240 to vote on their favorite feature, or the feature they believe the company should build into its own product or an existing product.

Column 220A is the feature or idea name. In an embodiment, a user may click on or select one of the ideas, and the table 208 may expand to display more information about the idea. This additional information may include, for example, description, estimated availability or completion date, team leaders, etc. Column 220B is a category of the idea, which may include a division within a company, target audience, related software program, etc. Effort 220C may indicate a measure of how many resources may be needed to build or implement the idea. Effort 220C may be a measure of time, money, human resource hours, computing resources, etc. Total 220D may indicate how many tokens, coins, or virtual currency the particular user (or community 270) has allocated to the respective ideas.

The refresh indicator 210 may illustrate that the records of table 208 are unsorted because of a change in one or more of the values of total column 220D. For example, when the values of a column are determined to be un-sorted based on a modification 112, the refresh indicator 210 may be displayed. In an embodiment, a sort indicator may change to refresh indicator 210 when there is a rollover event detected. DSR 102 may detect a rollover event on the column heading or any of the values of the column. In other embodiments, refresh indicator 210 may be displayed without any such rollover events.

The hand indicator 230 may indicate that a user can click the refresh indicator 210 to refresh or re-sort the values of the table 208 based on the indicated column(s). However, if the mouse indicator 230 is scrolled away from the Total column, then the mouse indicator may return to an arrow indicator and the refresh indicator 210 may return to its original descending order icon (e.g., 111B). In another embodiment, the refresh indicator 210 may remain indicating a refresh indicator or icon even during scroll away events.

As illustrated by 240, there may a count of how many virtual coins or tokens the user (or community 270) has remaining to allocate to various ideas. The allocation of tokens by specific users may enable a company or organization to determine how important different ideas are to particular users (relative to other ideas) and/or how important ideas 220A are relative to a community of users 270 at large.

In an embodiment, the allocation of tokens by the user may impact an overall ranking 250, Ranking 250 may include a ranking or ordering of the ideas (of column 220A) with regard to the users of community 270, while the ordering of ideas based on total 220D may be for a specific user.

In another embodiment, the ideas of table 208 may be ordered by their community rank 250, and total 220D may be updated as various other users of community 270 update their own coin allocations. So that when another user allocates or deallocates virtual currency to or from the ideas 220A, such that the sort (by total 220D) changes, DSR 102 may display refresh indicator 210, indicating the sort has changed.

If the order or ranking 250 changes, then DSR 102 may apply a refresh indicator (as illustrated by 210, 111C) indicating the ordering or sort of the ideas has changed. In an embodiment, the refresh indicator 210 may only be applied to those values or records that are impacted by the ranking change. For example, if the "4+fields" record moved up in rankings in front of the "Edit Character" record, then a refresh indicator 210 may be applied to values from one or both of those affected records. Or may be displayed in the total column 220D as illustrated.

Figure 3:
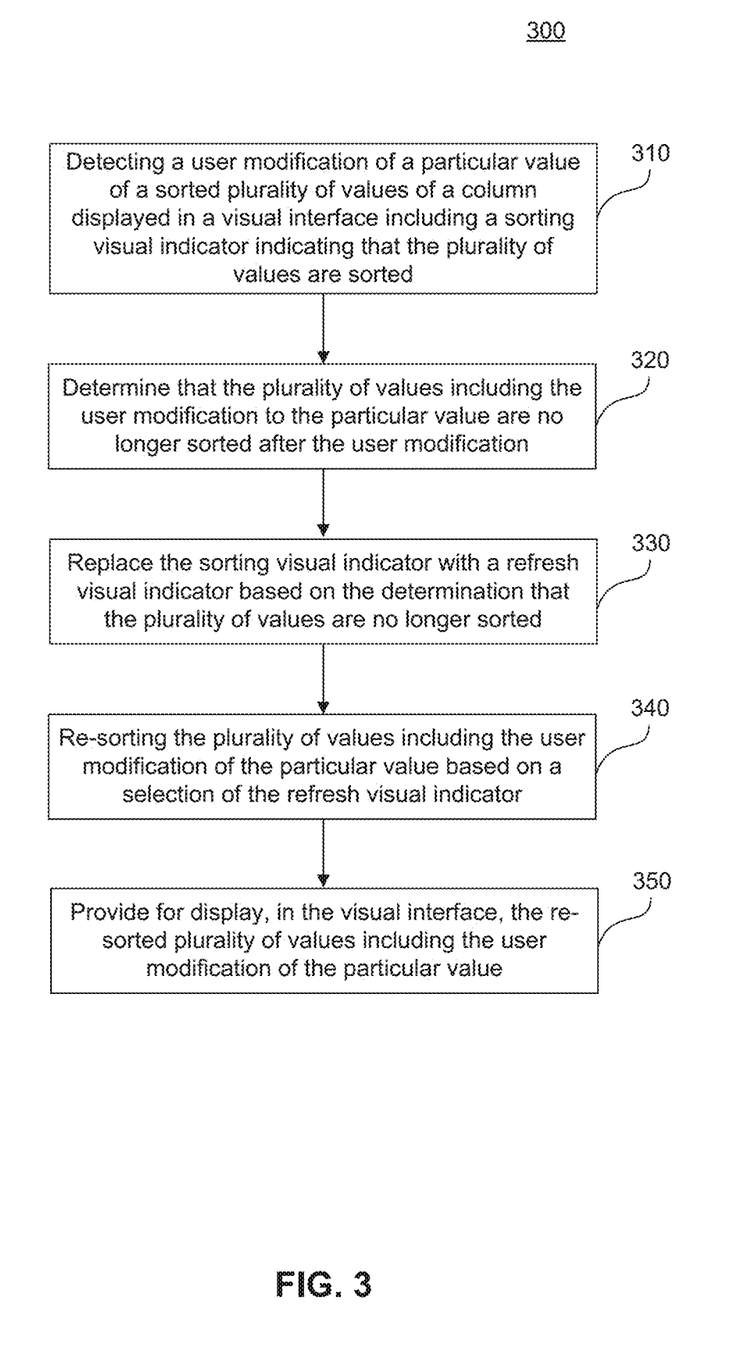
FIG. 3 is a flowchart illustrating a process for providing example operations and functionality related to data sorting and rating, according to some embodiments.

FIG. 3 is a flowchart illustrating a process 300 for providing example operations and functionality related to data sorting and rating, according to some embodiments.

Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, a user modification of a particular value of a sorted plurality of values of a column displayed in a visual interface is detected. For example, DSR 102 may detect a modification 112 of a value of table 108 from user interface 106. User interface 106 may include a sort indicator 110, such as icon 111A or 111B, indicating that the records of table 108 are sorted by the votes column.

At 320, it is determined that the plurality of values including the user modification to the particular value are no longer sorted after the user modification. For example, DSR 102 may determine that modification 112 un-sorts two or more of the values from the sorted column (e.g., votes column). For example, if the value of modification 112 is less than or equal to 15 or greater than or equal 20, that may cause the records of table 108 to no longer be sorted by the values column or another secondary sorted column (such as employee name or region). In an embodiment, if a particular column has one thousand values, and a modification 112 un-sorts two of the one thousand values, then the values of the column are no longer sorted (even if the other 998 values remain sorted).

At 330, the sorting visual indicator is replaced with a refresh visual indicator based on the determination that the plurality of values are no longer sorted. For example, sort indicator 110 which may have been 111A or 111B indicating a direction or type of sort may be replaced with a refresh indicator 111C indicating that two or more of the values are unsorted based on an update or modification 112. As described above, in other embodiments, refresh indicator 111C may include a color or font size or font style change.

At 340, the plurality of values including the user modification of the particular value are re-sorted based on a selection of the refresh visual indicator. For example, as illustrated by refresh indicator 210, a user may select with a touch screen, keyboard selection, or mouse press 230 of refresh indicator 210 to request a re-sort of the records. DSR 102 may then provide for re-sorting, or may re-sort two or more of the records based on the modification 112.

At 350, the re-sorted plurality of values including the user modification of the particular value are provided for display in the visual interface. For example, after selecting or requesting a re-sort, DSR 102 may display the records updated after the re-sort. In an embodiment, the refresh indicator 111C may then be replaced with the original sort indicator 111A or 111B indicating that the records are sorted by that column in the identified sort order.

Figure 4:
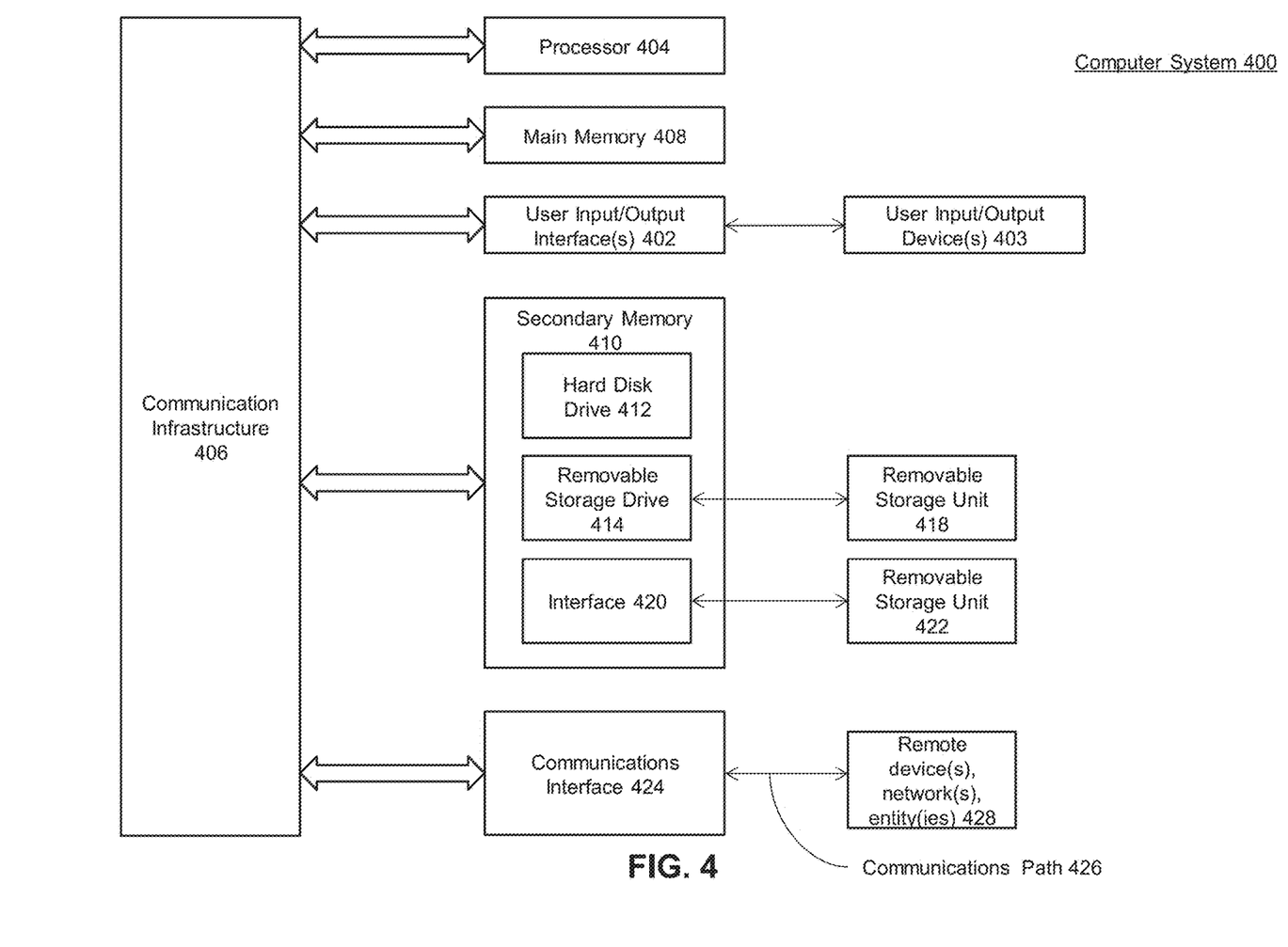
FIG. 4 is an example computer system useful for implementing various embodiments.

Various embodiments can be implemented, for example, using one or more computer systems, such as computer system 400 shown in FIG. 4. Computer system 400 can be used, for example, to implement the systems described above with respect to the figures, and/or the method of FIG.

4. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428), For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as lone as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    detecting a user modification of a particular value of a sorted plurality of values of a column displayed in a visual interface, wherein the visual interface includes a sorting visual indicator indicating that the plurality of values are sorted;
    changing a textual property of the user modification of the particular value in response to a determination that at least a portion of the plurality of values, including the user modification of the particular value, are unsorted after the user modification;
    replacing the sorting visual indicator with a refresh visual indicator in response to the determination that the plurality of values are no longer sorted, wherein the refresh visual indicator is associated with the column;
    re-sorting the plurality of values including the user modification of the particular value based on a selection of the refresh visual indicator; and
    providing for display, in the visual interface, the re-sorted plurality of values including the user modification of the particular value, wherein the changed textual property of the user modification of the particular value is removed.

2. The method of claim 1 wherein the replacing comprises:
    detecting a rollover event over the sorting visual indicator; and
    replacing, during the rollover event, the sorting visual indicator with a refresh visual indicator based on the determination that the plurality of values are no longer sorted.

3. The method of claim 1, wherein the providing comprises:
    providing for display, in the visual interface, the re-sorted plurality of values including the user modification of the particular value and the storing visual indicator indicating that the re-sorted plurality of values are sorted.

4. The method of claim 1, wherein the detecting the user modification comprises:
    detecting that a user changed an allocation of a virtual currency to the particular value for a corresponding record of a table including the column, wherein the virtual currency is assignable to any of the plurality of values of the column corresponding to any of a plurality of records of the table.

5. The method of claim 4, further comprising:
    determining that an amount of the virtual currency assignable by the user to the plurality of values is decreased by an amount corresponding to the allocation.

6. The method of claim 4, wherein each of the plurality of records corresponds to a feature of a software program, and wherein the plurality of values correspond to an attributed importance of each corresponding feature as determined by the allocation.

7. The method of claim 6, wherein the user modification affects a ranking of the features of the software program amongst a community of a plurality of users, each of whom who are allocated assignable virtual currency to attribute to any of the features.

8. The method of claim 1, wherein the refresh visual indicator includes two different sort visual indicators corresponding to an ascending sort functionality and a descending sort functionality.

9. The method of claim 8, wherein the providing for display the re-sorted plurality of values comprises:
    displaying one of a sorting visual indicator corresponding to the ascending sort functionality or a sorting visual indicator corresponding to the descending sort functionality.

10. A computer-implemented method, comprising:
    a memory; and
    at least one processor coupled to the memory and configured to perform operations comprising:
        detecting a user modification of a particular value of a sorted plurality of values of a column displayed in a visual interface, wherein the visual interface includes a sorting visual indicator indicating that the plurality of values are sorted;
        changing a textual property of the user modification of the particular value in response to a determination that at least a portion of the plurality of values, including the user modification of the particular value, are unsorted after the user modification;
        replacing the sorting visual indicator with a refresh visual indicator in response to the determination that the plurality of values are no longer sorted, wherein the refresh visual indicator is associated with the column;
        re-sorting the plurality of values including the user modification of the particular value based on a selection of the refresh visual indicator; and
        providing for display, in the visual interface, the re-sorted plurality of values including the user modification of the particular value, wherein the changed textual property of the user modification of the particular value is removed.

11. The method of claim 10, wherein the replacing comprises:
    detecting a rollover event over the sorting visual indicator; and
    replacing, during the rollover event, the sorting visual indicator with a refresh visual indicator based on the determination that the plurality of values are no longer sorted.

12. The method of claim 10, wherein the providing comprises:
    providing for display, in the visual interface, the re-sorted plurality of values including the user modification of the particular value and the storing visual indicator indicating that the re-sorted plurality of values are sorted.

13. The method of claim 10, wherein the detecting the user modification comprises:
    detecting that a user changed an allocation of a virtual currency to the particular value for a corresponding record of a table including the column, wherein the virtual currency is assignable to any of the plurality of values of the column corresponding to any of a plurality of records of the table.

14. The method of claim 13, the operations further comprising:
    determining that an amount of the virtual currency assignable by the user to the plurality of values is decreased by an amount corresponding to the allocation.

15. The method of claim 13, wherein each of the plurality of records corresponds to a feature of a software program, and wherein the plurality of values correspond to an attributed importance of each corresponding feature as determined by the allocation.

16. The method of claim 15, wherein the user modification affects a ranking of the features of the software program amongst a community of a plurality of users, each of whom who are allocated assignable virtual currency to attribute to any of the features.

17. The method of claim 10, wherein the refresh visual indicator includes two different sort visual indicators corresponding to an ascending sort functionality and a descending sort functionality.

18. The method of claim 17, wherein the providing for display the re-sorted plurality of values comprises:
    displaying one of a sorting visual indicator corresponding to the ascending sort functionality or a sorting visual indicator corresponding to the descending sort functionality.

19. A non-transitory computer-readable device having instructions stored on a memory thereon that when executed by at least one processor of the device, cause the at least one processor to perform operations comprising:
    detecting a user modification of a particular value of a sorted plurality of values of a column displayed in a visual interface, wherein the visual interface includes a sorting visual indicator indicating that the plurality of values are sorted;
    changing a textual property of the user modification of the particular value in response to a determination that at least a portion of the plurality of values, including the user modification of the particular value, are unsorted after the user modification;
    replacing the sorting visual indicator with a refresh visual indicator in response to the determination that the plurality of values are no longer sorted, wherein the refresh visual indicator is associated with the column;
    re-sorting the plurality of values including the user modification of the particular value based on a selection of the refresh visual indicator; and
    providing for display, in the visual interface, the re-sorted plurality of values including the user modification of the particular value, wherein the changed textual property of the user modification of the particular value is removed.

20. The device of claim 19, wherein the replacing operations comprise:
    detecting a rollover event over the sorting visual indicator; and
    replacing, during the rollover event, the sorting visual indicator with a refresh visual indicator based on the determination that the plurality of values are no longer sorted.

* * * * *